US011849036B2

(12) United States Patent
Neystadt et al.

(10) Patent No.: US 11,849,036 B2
(45) Date of Patent: Dec. 19, 2023

(54) KEY ROTATION FOR SENSITIVE DATA TOKENIZATION

(71) Applicant: Akamai Technologies Inc., Cambridge, MA (US)

(72) Inventors: Eugene (John) Neystadt, Kfar-Saba Central (IL); Jonathan Herzog, West Hartford, CT (US); Ittay Dror, Rishon Lezion (IL); Elisha Ben-Zvi, Hod Hasharon (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/808,327

(22) Filed: Jun. 23, 2022

(65) Prior Publication Data

US 2023/0108907 A1    Apr. 6, 2023

Related U.S. Application Data

(63) Continuation of application No. 16/579,967, filed on Sep. 24, 2019, now Pat. No. 11,381,393.

(51) Int. Cl.
*H04L 9/08*    (2006.01)
*H04L 9/32*    (2006.01)
*G06F 21/62*   (2013.01)

(52) U.S. Cl.
CPC .......... *H04L 9/0869* (2013.01); *G06F 21/629* (2013.01); *G06F 21/6209* (2013.01); *H04L 9/3213* (2013.01); *H04L 2209/24* (2013.01)

(58) Field of Classification Search
CPC . H04L 9/0869; H04L 9/3213; H04L 2209/24; G06F 21/629; G06F 21/6209
See application file for complete search history.

(56) References Cited

U.S. PATENT DOCUMENTS

| 8,370,648 B1 * | 2/2013 | Natanzon ............ G06F 12/1408 713/193 |
| 11,381,393 B2 | 7/2022 | Neystadt et al. |
| 2005/0216773 A1 * | 9/2005 | Mitchell ................. H04L 9/083 726/5 |

(Continued)

OTHER PUBLICATIONS

U.S. Appl. No. 16/579,967, filed Sep. 24, 2019, (issued as U.S. Pat. No. 11,381,393).

(Continued)

*Primary Examiner* — Mohammed Waliullah (57) ABSTRACT

This document describes techniques for rotating keys used to tokenize data stored in a streaming data store where data is stored for a maximum time [W]. In some embodiments, a data layer of such a data store can encrypt arriving original data values twice. The original data value is first encrypted with a first key, producing a first token. The original data value is encrypted with a second key, producing a second token. Each encrypted token can be stored separately in the data store. A field may be associated with two database columns, one holding the value encrypted with the first key and the second holding the value encrypted with the second key. Keys are rotated after time [K], which is at least equal to and preferably longer than [W]. Rotation can involve discarding the older key and generating a new key so that two keys are still used.

10 Claims, 4 Drawing Sheets

(56) References Cited

U.S. PATENT DOCUMENTS

2012/0137018 A1    5/2012  Uhlig
2012/0137164 A1    5/2012  Uhlig
2013/0227303 A1*  8/2013  Kadatch .............. G06F 21/6218
                                                      713/193

OTHER PUBLICATIONS

Transmittal Letter titled Communication Under MPEP § 609.02, submitted with this SB/08, Jun. 23, 2022, 1 page.

* cited by examiner

KEY ROTATION FOR SENSITIVE DATA TOKENIZATION

BACKGROUND

Technical Field

This application relates generally to information security and more particularly to systems, methods, and apparatus for rotating keys used to secure sensitive data. This application also relates to computer data stores, including with limitation, databases.

Brief Description of the Related Art

There is often a need to store sensitive data—such as personal information or payment data like credit card numbers or bank account information—in computer storage systems. Doing so creates a risk of a data breach, e.g., that an adversary might gain unauthorized access to that computer system and steal the sensitive data.

A common practice to protect against the risk of a data breach is to tokenize the stored data. Tokenization generally involves replacing sensitive values with tokens. Tokens are typically an encrypted version of the value, although not limited to such. The opaque tokens are stored instead of the sensitive values. To recover the original value from a token, keys or token mapping is required. A key or token mapping is generally stored in a separate, secondary system that is inaccessible by the people or systems that are granted access to the primary storage system.

Information security best practices include periodic key rotation for the keys used for tokenization. Implementing periodic key rotation for tokenization is very hard. Two known approaches for key rotation are 'data conversion' and 'application level awareness'. Each has significant downsides.

The 'data conversion' option requires changing every value in an entire data set, individually. The data storage system initiates a process that involves reading each tokenized value, de-tokenizing it with the current key, producing a new token with a new key, and writing back this new token to the data store. This is a long process, during which the data store cannot be used for its primary purpose.

The 'data conversion' option is especially challenging for streaming big-data systems, where new data is being created continuously. Temporary suspension of data insertion for the conversion process is often unacceptable. Furthermore, big-data systems often employ an 'append only' paradigm, which disallows modification of existing data. That makes key change ever more complex.

The 'application level awareness' option involves making applications aware of the various keys that the data store has used to tokenize the records. The applications thus know that same value can be represented with different tokens. This approach requires application logic for every query to the data store, and for every retrieval, update or aggregation. For example, if during a given interval the tokenization key was changed, then a given user record in a database would include user-token-1 (created from the first key), and some other records would have user-token-2 (created from the second key). To count all payments done by the user, a single database query can not be used anymore. Instead, the application must execute two separate queries, as follows:

1. Count1=SELECT COUNT (payment) WHERE user-id=user-token1
2. Count2=SELECT COUNT (payment) WHERE user-id=user-token2

Then, TotalCount=Count1+Count2.

Normally, tokenization is implemented inside the data layer; it is hidden from applications. As a result, supporting key change by forcing each application to be aware of tokenization tremendously complicates application logic.

It is desirable to provide improved methods, systems, and apparatus for rotating keys in data stores with tokenization systems. Such methods, systems, and apparatus would improve the operation of data storage system, and in turn the computer systems in which they run and which they serve. It is an object of this patent document to describe systems, methods and devices to meet this need. Further, those skilled in the art will understand these and other improvements from the teachings hereof.

BRIEF SUMMARY

This document describes, among other things, systems, methods and apparatus for rotating keys used to tokenize data stored in a data store such as a database. Key rotation techniques can take advantage of the fact that streaming big data systems typically limit period for which data is stored (referred to as a some time limit, or window, [W]). In some embodiments, a data layer of such a data store encrypts each original data value twice. In other words, an original data value is first encrypted with a first key and this produces a first token. The original data value is also encrypted with a second key and this produces a second token. Each encrypted token is stored separately in the data store, e.g., a given field in the database may be associated with two separate database columns, one holding the value encrypted with the first key and the second holding the value encrypted with the second key.

Keys are rotated after a time [K]. For example, after [K] elapses, the first key can be deleted and no longer used; the second key remains; a (new) third key is generated. During the next time period—until [K] elapses again—the second and third keys can be used for tokenizing. This process continues every time period [K]. During a given time period, the older key can be referred as the 'previous key', while the newer key can be referred to as the 'current key'.

If data is stored for a maximum time [W], and [K] is longer than [W], then the foregoing approach ensures that there will always be a single key that can be used to recover all currently stored values for a given field (e.g., by reading a particular column in the database). This means that a single key can be used to search, count, or otherwise perform a query on the currently stored values for a given data field.

In embodiments, the data layer of the data store mediates access to the tokenized data. To read a single tokenized version of a data value and recover the original, the data layer can select one of the two keys available for that item and decrypt it. To execute an operation against a data field that requires reading many or all of the tokenized values for that field, the data layer selects one of the two active keys and a corresponding set of data (e.g., the column in a database) encrypted with the selected key.

The foregoing is a brief description of certain non-limiting aspects (embodiments) of the teachings hereof for purposes of illustration only; it is not a definition of the invention. The claims define the scope of protection that is sought, and they are incorporated by reference into this brief summary.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying components being discussed in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTTP/S), such as when TLS-secured connections are established. The term "server" is used herein to include embodiments using either actual or virtualized hardware (a computer configured as a server, also referred to as an actual or virtualized "server machine") with server software running on such hardware (e.g., a web server). The terms "client" and "client device" are used herein to include embodiments having any combination of hardware with software. Put another way, while context may indicate the hardware or the software exclusively, should such distinction be appropriate, the teachings hereof can be implemented in any combination of hardware and software. The term web page or "page" is meant to refer to a browser or other user-agent presentation defined by an HTML or other markup language document.

Technique for Rotating Keys

Figure 1:
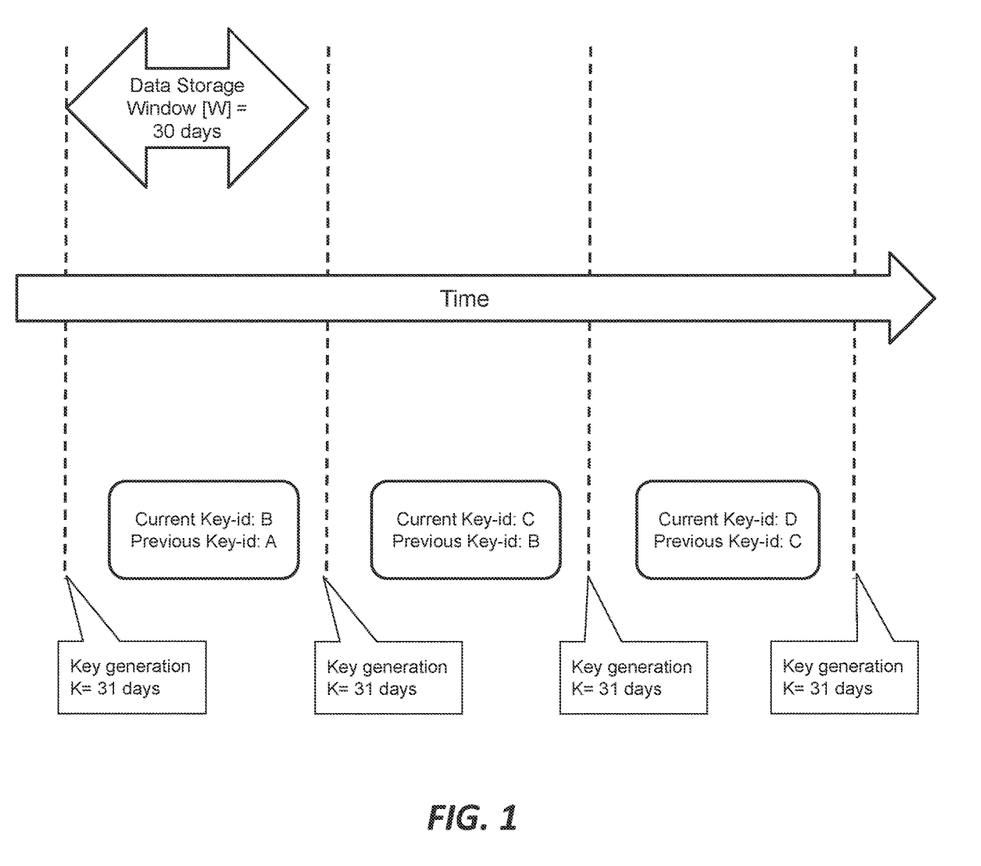
FIG. 1 is a diagram illustrating one embodiment of a technique for rotating keys used to tokenize data, in accordance with the teachings hereof.

FIG. 1 illustrates, in one embodiment, a technique for rotating keys. The focus of the teachings herein are big data streaming system that store incoming data values for a limited period of time. One example of that is a system for processing of web server logs or logs of email transactions. Such logs are typically stored for a limited time period, such as 30 or 90 days. This time period is referred to in FIG. 1 as the data window [W], which is sometimes referred to herein as the data lifetime. (Of course, the arrow denoting [W] in FIG. 1 is only one example for a data value written to the data store immediately after the first dotted line in the timeline—however, the period [W] for any given data value begins when the data value is written and ends [W] time later for that given data value.)

In the embodiments described herein, which focus on big data streaming systems that store data for limited period of time as mentioned above, the key rotation period is referred to as [K], and [K] is selected to be greater than or equal to [W]. Preferably, in order to provide a safety margin and account for potential delays in the database operations, [K] is greater than [W]. For example, if data is kept for W=90 days, the key can be changed every K=91 days.

As shown in FIG. 1, in this embodiment, in any given key rotation interval (delineated by the dotted lines) there are two keys, referred to as a current key and a previous key. Assume that a given field to be stored in a database contains sensitive data, such as a credit card number for each user. The original data values for this field (the credit card number field) are tokenized (e.g., encrypted) by the data layer with each of the two keys. The two encrypted values are then stored in a separate indexed columns in the database, e.g., a column for the tokenized versions of the credit card numbers created with the previous key, and a column for the tokenized versions created with the current key. In sum, the database entry for a given field stores the corresponding data value (the actual credit card number) in two columns as two tokenized versions of the original data value, created from the two different keys.

The fact that [K] is always longer than [W] ensures that one of the two columns will have all valid values (less than [W] old) encrypted with the same key, so that such column can be searched or counted to support database queries or other operations.

To impose a desired maximum lifetime [W] on data stored in the data store the system can, for example: (i) discarding versions of the original data values in the data store older than [W], or (ii) select [K] to be longer than [W].

As shown in FIG. 1, when time comes to rotate keys, the previous key is discarded, the current key becomes the previous key (which is still in use), and a new key is generated to become the current key. Also, the database column storing values encrypted with the previous key is discarded (or otherwise no longer used), the database column storing values encrypted with the current key is then renamed to be (or re-designated as) the column associated with the previous key, and a new (empty) database column is created to be populated with values encrypted with the newly generated key.

System for Rotating Keys

Figure 2:
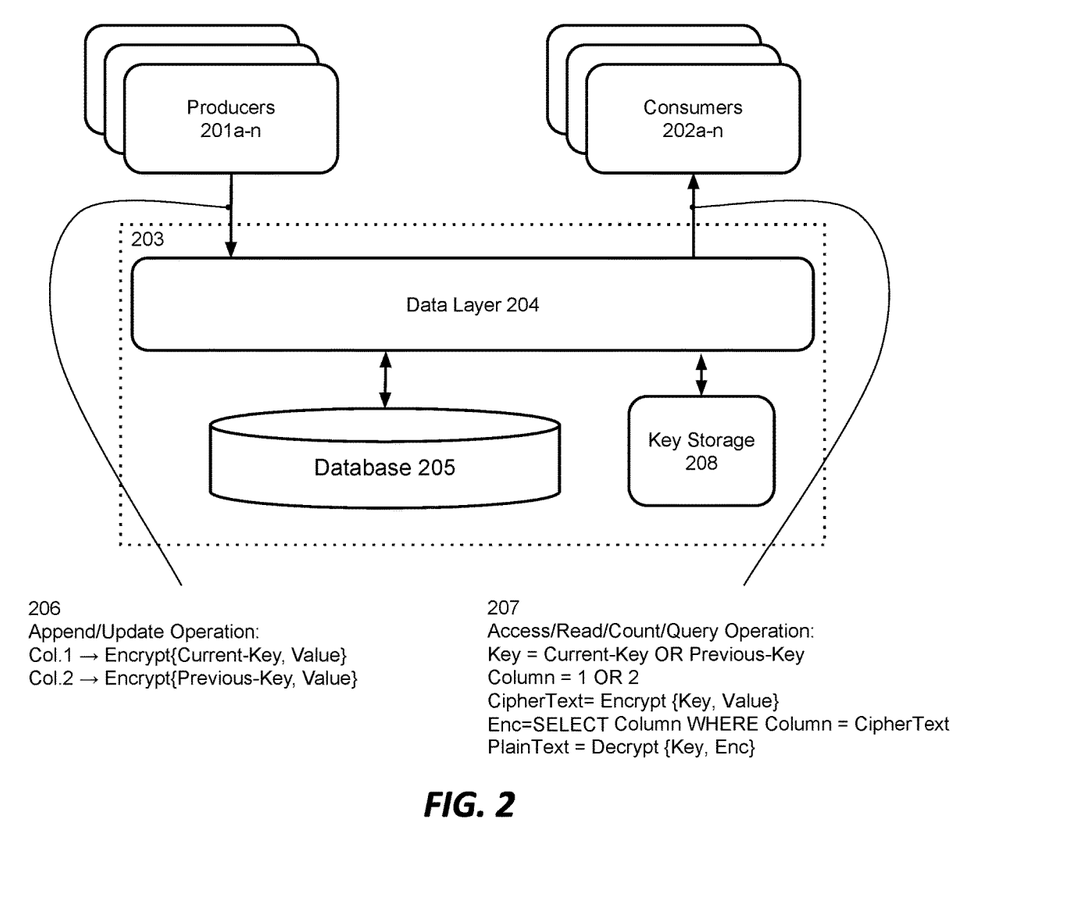
FIG. 2 is a diagram illustrating one embodiment of a data store with a data layer, a key store, and a database, in accordance with the teachings hereof.

FIG. 2 provides a high level overview of a system in accordance with the teachings hereof. The data store 203 has multiple components: the data layer 204 and the database 205 and the key storage 206. The data layer component 204 mediates access with the producers 201 and/or the consumers 202 of the data store 203, which are typically applications that may wish to write or read or otherwise interact with the database. A given client application may be a producer 201 and/or the consumer 202 of the data store 203, depending on what actions it performs with respect to the data store 203. The data layer 204 hides the tokenization and other processes from the client applications.

The data layer 204 can perform the key rotation and tokenization operations described in connection with FIG. 1, preferably in a manner transparent to the consumers and producers 201/202 that are interacting with the data store. The data layer 204 chooses which version (current or previous) of a key to use, and selects the corresponding database column, which will have all values (more recent than the time period [W]) encrypted with the same key.

The operation to append or update or otherwise 'write' data to the database 205 is shown on the left hand side at 206. As indicated, the data value to be stored in the database 203 is encrypted with each of two keys and the results are stored in two corresponding columns. When data needs to be accessed, e.g., for a count or other query, then the data layer 204 can execute the operations at 207.

The producers/consumers interface with the data layer 204 to access the database 205 (e.g., the data layer 204 may provide a suitable API). They need not be aware of the key management/rotation, nor the column selection operations that the data layer 204 performs.

Data Store Operation and Function

Now provided is a detailed description of the operation of the components of the data store 203 shown in FIG. 2, in accordance with one embodiment.

The Key Storage 206

The key storage 206 stores two keys, a 'current-key' and a 'previous-key'. It also can also store key metadata, which includes, for each key, a key-id, which is incremented each time new key is generated. The key metadata also includes a [key-rotation-date], which is when each key was generated. To support the data layer 204 in key rotation, every interval [K] the key storage 206 generates a new key. Upon every key rotation, the [key-rotation-date] is set to current time.

The Database 205

The database component 205 stores two columns for each field that is sensitive or otherwise taking advantage of the key rotation techniques described herein. For example, a credit card number has two columns under the field "credit card number". A field such as "bank account identifier" would likewise be stored in two columns. Although implementations may vary, in this embodiment Column-1 stores the data value encrypted with current-key. Column-2 stores the data value encrypted with previous-key. If search by the tokenized value is needed, both Column-1 and Column-2 should be defined as indexes. Conventional database technologies, as modified by the teachings hereof, can be used to implement the database component 205.

The Data Layer 204

The data layer 204 works with the key storage 206 to rotate keys. The data layer 204 can be implemented in a wide variety of ways. For example, it can run inside an application as an API encapsulating the tokenization logic. It can be run as a separate network service as a proxy between an application (e.g., a producer/consumer 201/202) and the database 205. It can also be implemented inside application logic itself.

The data layer 204 has access to the keys from the key storage 206, and it is aware of the key rotation schedule [key-rotation-date].

To access data values from the database 205, the data layer 204 performs the following:

Key Selection:
If ([current-date] minus [key-rotation-date]) is >[W] selects
(1) Key=Current-key
(2) Column-Name=Column-1
Otherwise
(1) Key=Previous-key
(2) Column-Name=Column-2

After key selection, the data layer 204 executes data operations as follows:

For data retrieval, the data layer 204 uses selected Column-Name to access (SQL SELECT) the data. It then decrypts the retrieved data using selected Key.

For searches such as SQL WHERE, the data layer 204 encrypts the query value (i.e., the value that is the target of the search) using selected Key and put it as a condition to Column-Name=Encrypted-Value.

For data writes/update (in embodiments where the system enables data updates), the data layer 204 encrypts the data value that is being written/updated using current and previous keys and update both versions in the database (SQL UPDATE/INSERT).

Figure 3:
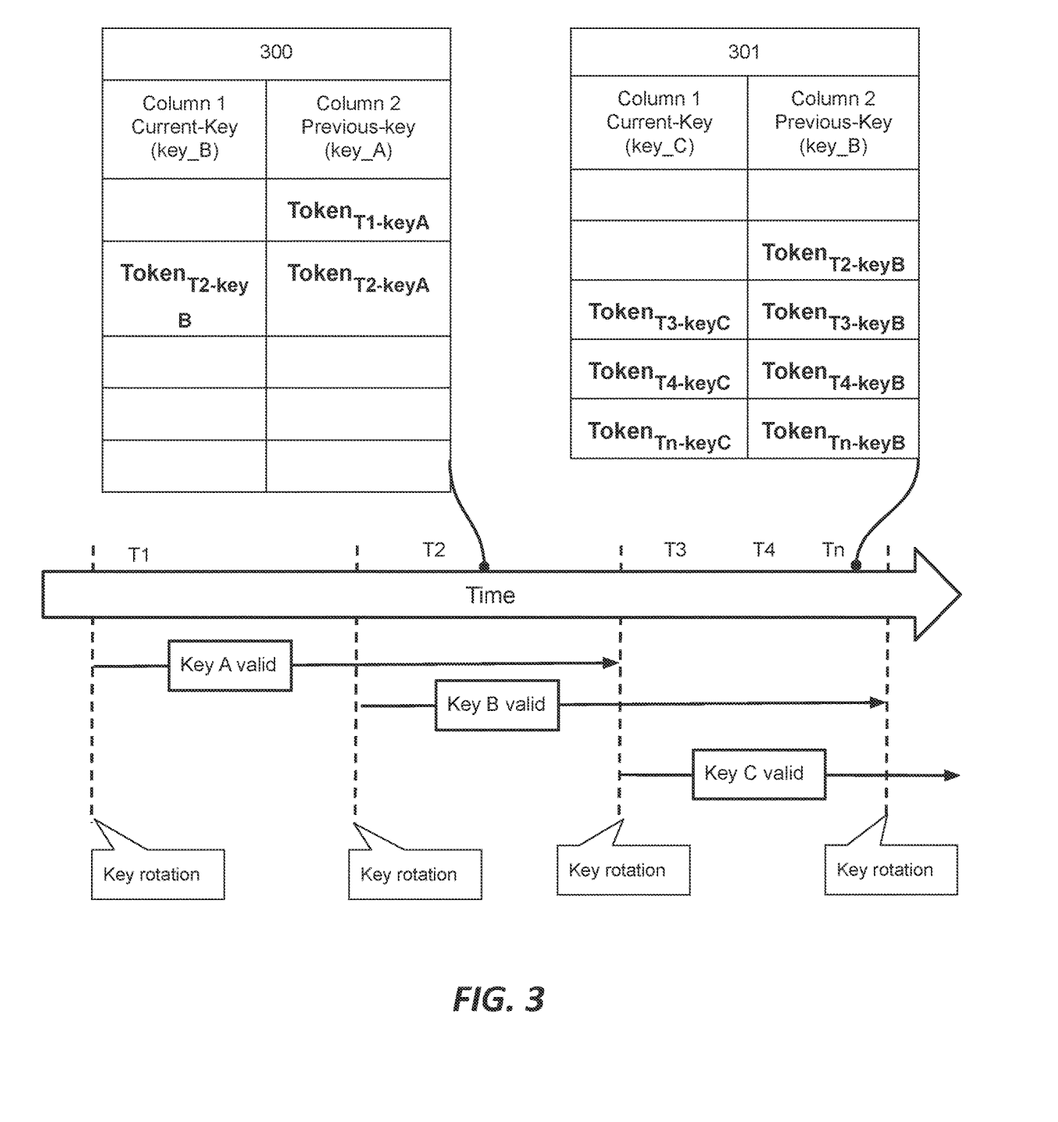
FIG. 3 is a table illustrating, in a non-limiting example, some aspects of the concepts of key rotation, and key and column selection; and, FIG. 4 is a block diagram illustrating hardware in a computer system that may be used to implement the teachings hereof.

The concept and result of key and column selection is illustrated in FIG. 3, in one embodiment. Assume tokenized data values $Token_{T\text{-}key}$ are being stored in the columns 1 and 2, where T indicates the arrival time [T1, T2 . . . Tn] of the data value and key indicates the key [keyA, keyB . . . keyN] used to encrypt the data value into the token. Box 300 shows the state of the system in the past, just after time T2, while box 301 shows the state of the system at time Tn. Box 300 thus shows, e.g., the use of the key_A, which at time Tn has been discarded due to a key rotation (note: the column associated with key_A is no longer stored in the database, or if it is still stored, that key has been discarded).

As can be seen in box 301 of FIG. 3, at time Tn, if the ([current-date] minus [key-rotation-date]) is >[W]), then column 1 for key C (the current-key at time Tn) will have all tokenized data values that are not expired (over [W] old); note $Token_{T2\text{-}keyB}$ would be older than [W] at that time, as it arrived before the last key rotation that started the use of key_C, which at time Tn is the current-key.

If it is not the case that ([current-date] minus [key-rotation-date]) is >[W]), then column 2 for the previous-key at time Tn (key_B) will have all tokenized values that are not too old. Of course, the value $Token_{T2}$ was written to the database only with key_A (now discarded) and key_B. Nevertheless, these values are accessible in column 2 with key_B. Tokenized value $T_{1\text{-}keyA}$ is no longer usable (since key_A has been discarded), but that tokenized value is more than [W] old.

Any of a wide variety of encryption algorithms may be used by the data layer 204. For the use-cases described herein, the encryption has to be deterministic—namely, same value encrypted each time produces the same output. One such symmetric deterministic cipher, is AEAD_AES_SIV_CMAC_256 (specified in RFC 5297), but other ciphers can be used. Elliptic curve cryptography with public/private key pairs can also be used, although their performance is lower, and if this is a concern, then a symmetric key derived from the key-pair can be used.

Alternative Column Naming Approach

It should be noted that the names "Column-1" and "Column-2", as well as "Current-Key" and "Previous-Key" are merely examples of names that are used to help explain the teachings hereof. Those names do not necessarily need to be used. In some implementations, particularly where a data system does not support dropping columns but does support column-creation, the columns can be named after the key used to encrypt the data, e.g., "Key-expiring-01-January-2017", "Key-expiring-01-January-2018", "Key-expiring-01-January-2019", and the like. Then, for example, during a given time period, the column "Key-expiring-01-January-2017" is treated as the column storing the data value encrypted with previous-key (analogous to Column-2), while the column "Key-expiring-01-January-2018" is treated as the column storing the data value encrypted with current-key (analogous to Column-1). Upon key rotation, the designations are shifted, such that the column "Key-expiring-01-January-2018" is treated as the column storing the data value encrypted with previous-key and "Key-expiring-01-January-2019" is treated as the column storing the data value encrypted with previous-key.

Generalization Beyond Two Columns

The approach described above used two columns in the database to store tokenized values, and enforced a constraint of [K] being greater than or equal to [W], with a preference for [K] being greater than [W].

That approach can be generalized to other values of [K] with use of additional columns. For example:

If $[K]<[W]<=2[K]$, one needs three columns.
If $2[K]<[W]<=3[K]$, one needs four columns.
If $N[K]<[W]<=(N+1)[K]$, one needs (N+2) columns.

When more than two columns are used, adjustments are made to the data layer logic in order to be able to access data values, e.g., in response to a query. This is because with more than two columns, it is no longer the case that a single column (associated with a single key) can be guaranteed to hold all necessary data values.

The following approaches can be used to access data values in the case where there are more than two columns:

For data retrieval (e.g., queries), the data layer 204 uses selected Column-Names to access (SQL SELECT) the data. It then decrypts the retrieved data from each column using the respective selected Keys. This differs from the two-column approach in that multiple columns must be searched. Then, the resulting rows each SELECT query must be merged to construct a complete result. To perform a count, the system must aggregate the count from each query, summing the results across columns.

For searches such as SQL WHERE, the data layer 204 encrypts the query value (i.e., the value that is the target of the search) using selected Keys to encrypt the value and put it as a condition to WHERE (Column-1=Encrypted-Value1 OR Column-2=Encrypted-Value2 OR . . . ) for each key. This differs from the two-column approach in that the system must make multiple queries, one to each of the selection columns, each with its corresponding Keys.

It is noted that, as part of the above operations, to return results of data retrieval, counts, and searches, the database 205 will include the key-id of each data values to the data layer 204 component responsible for generating an answer to a client system, because decryption will need to be done with multiple keys.

For data writes/update (in embodiments where the system enables data updates), the data layer 204 encrypts the data value that is being written/updated using each of the N active keys, N being 3 or more, and update all versions in the database (SQL UPDATE/INSERT).

Similarly GROUP BY & ORDER BY clauses can be implemented to perform ordering or sorting of the results using multiple columns. U.S. Patent Publication No. 2012/0278897, filed Apr. 19, 2012, describes how to perform tokenization with order preservation and the teachings thereof can be used for this purpose, and are incorporated by reference in their entirety.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
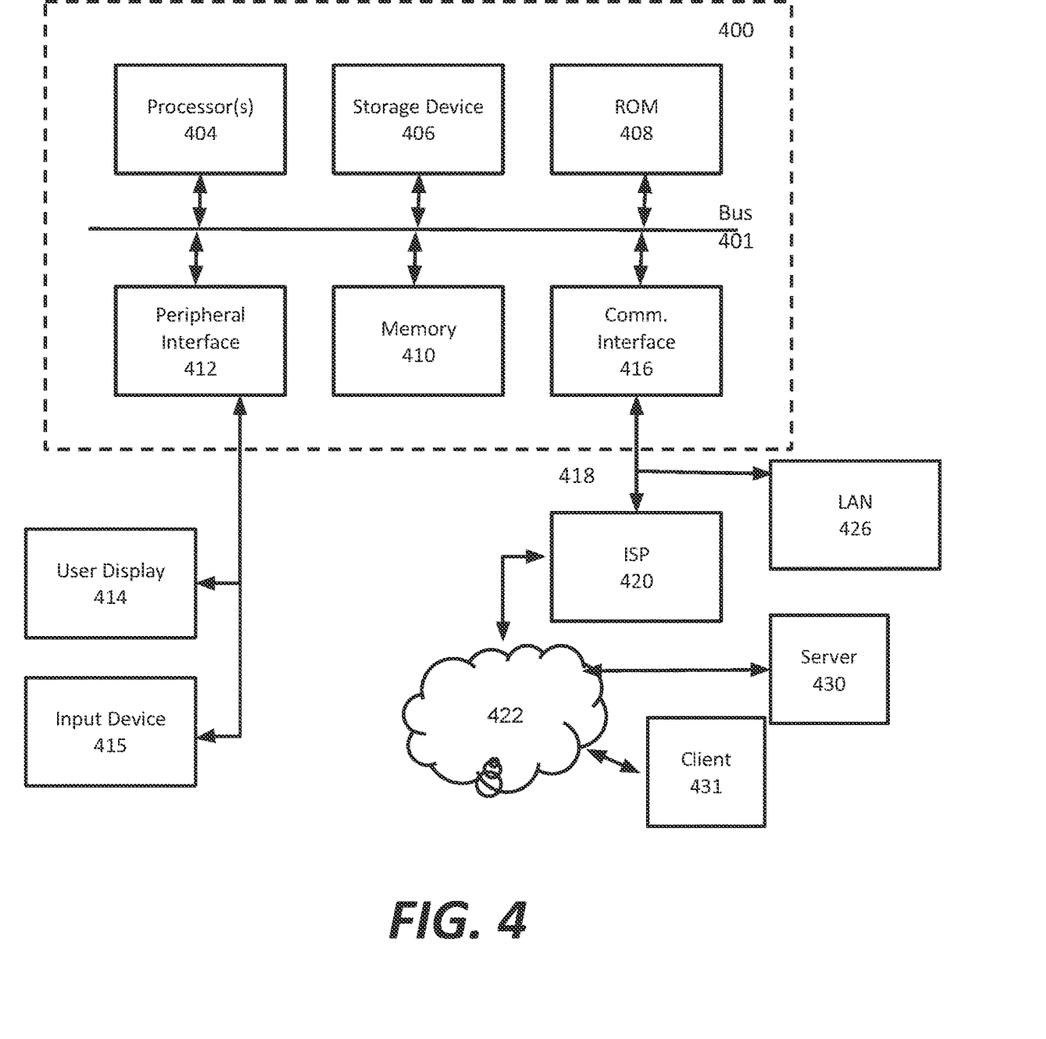

FIG. 4 is a block diagram that illustrates hardware in a computer system 400 upon which such software may run in order to implement embodiments of the invention. The computer system 400 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 400 includes a microprocessor 404 coupled to bus 401. In some systems, multiple processors and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 404. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 communicatively couples computer system 400 to a user display 414 that displays the output of software executing on the computer system, and an input device 415 (e.g., a keyboard, mouse, trackpad, touchscreen) that communicates user input and instructions to the computer system 400. Note that the computer system 400 may be operated remotely and need not have a local user interface. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer,) between the system bus 401 and an external communication link. The communication interface 416 provides a network link 418. The communication interface 416 may represent an Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 418 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for performing a read operation in a data store of a data layer, the method comprising:
    within the data layer providing data services to external client applications:
        receiving a request for a field;
        identifying first and second columns in the data store associated with the field, the first column holding a first encrypted value that was encrypted with a first key, and the second column holding a second encrypted value that was encrypted with a second key;
        selecting one of the first and second columns to read based at least in part on a difference in time between a current date-time and a date-time of a prior key rotation;
        upon selection of the first column, ignoring the second column, decrypting the first encrypted value using the first key, and sending the result in a response to the request for the field; and,
        upon selection of the second column, ignoring the first column, decrypting the second encrypted value using the second key rather, and sending the result in a response to the request for the field.

2. The method of claim 1, wherein the first and second keys are each time-limited keys.

3. The method of claim 1, wherein the date-time of the prior key rotation is a date-time of a most recent key rotation in the data layer.

4. The method of claim 1, wherein the selecting one of the first and second columns to read, based at least in part on the difference in time between the current date-time and the date-time of a prior key rotation, comprises:
    if the difference is greater than a maximum data lifetime in the data layer, selecting the first column; and,
    if the difference is less than the maximum data lifetime in the data layer, selecting the second column.

5. The method of claim 1, wherein the first key comprises a current key and the second key comprises a prior key.

6. A system, comprising one or more computers having circuitry forming one or more processors and memory holding computer program instructions for execution on the one or more processors to form a data layer that has a data store, the computer program instructions when executed causing the one or more computers to perform a read operation, the read operation comprising:
    within the data layer, which provides data services to external client applications:
        receive a request for a field;
        identify first and second columns in the data store associated with the field, the first column holding a first encrypted value that was encrypted with a first key, and the second column holding a second encrypted value that was encrypted with a second key;
        select one of the first and second columns to read based at least in part on a difference in time between a current date-time and a date-time of a prior key rotation;
        upon selection of the first column, ignore the second column, decrypting the first encrypted value using the first key, and sending the result in a response to the request for the field; and,
        upon selection of the second column, ignore the first column, decrypting the second encrypted value using the second key rather, and sending the result in a response to the request for the field.

7. The system of claim 6, wherein the first and second keys are each time-limited keys.

8. The system of claim 6, wherein the date-time of the prior key rotation is a date-time of a most recent key rotation in the data layer.

9. The system of claim 6, wherein the selection one of the first and second columns to read, based at least in part on the difference in time between the current date-time and the date-time of a prior key rotation, comprises:
    if the difference is greater than a maximum data lifetime in the data layer, selecting the first column; and, if the difference is less than the maximum data lifetime in the data layer, selecting the second column.

10. The system of claim 6, wherein the first key comprises a current key and the second key comprises a prior key.

* * * * *